US012541176B2

(12) United States Patent
Nagasawa et al.

(10) Patent No.: US 12,541,176 B2
(45) Date of Patent: Feb. 3, 2026

(54) COMPONENT MOUNTING MEMBER, CASE AND TIMEPIECE

(71) Applicant: CASIO COMPUTER CO., LTD., Tokyo (JP)

(72) Inventors: Shouta Nagasawa, Machida (JP); Shin Hitsumoto, Akishima (JP); Hajime Iguchi, Fuchu (JP); Yuji Doi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 195 days.

(21) Appl. No.: 17/684,877

(22) Filed: Mar. 2, 2022

(65) Prior Publication Data

US 2022/0291635 A1 Sep. 15, 2022

(30) Foreign Application Priority Data

Mar. 11, 2021 (JP) ................................. 2021-039489

(51) Int. Cl.

| | |
|---|---|
| ***G04B 37/08*** | (2006.01) |
| ***G04G 17/02*** | (2006.01) |
| *H01R 12/77* | (2011.01) |
| *H01R 31/06* | (2006.01) |

(52) U.S. Cl.

CPC ........... *G04B 37/088* (2013.01); *G04G 17/02* (2013.01); *H01R 12/777* (2013.01); *H01R 31/06* (2013.01)

(58) Field of Classification Search

CPC .... G04G 17/06; H01R 13/52; H01R 13/5202; H01R 13/521

See application file for complete search history.

(56) References Cited

U.S. PATENT DOCUMENTS

| | | | | |
|---|---|---|---|---|
| 6,781,921 | B2 | 8/2004 | Markart | |
| 10,594,058 | B2 | 3/2020 | Kan et al. | |
| 10,658,866 | B2 | 5/2020 | Kitazawa | |
| 11,462,788 | B2 | 10/2022 | Enomoto et al. | |
| 2003/0102639 | A1 * | 6/2003 | Kigawa ................ | F16J 15/3284 428/509 |

(Continued)

FOREIGN PATENT DOCUMENTS

| | | | |
|---|---|---|---|
| JP | 2001015192 | A | 1/2001 |
| JP | 2004-085232 | A | 3/2004 |

(Continued)

OTHER PUBLICATIONS

Notice of Reasons for Refusal dated Nov. 1, 2022 received in Japanese Patent Application No. JP 2021-039489.

(Continued)

*Primary Examiner* — Renee S Luebke
*Assistant Examiner* — Matthew Daniel Hwang
(74) *Attorney, Agent, or Firm* — Scully, Scott, Murphy & Presser, P.C.

(57) ABSTRACT

A component mounting member including a base member which is provided with an attachment hole and attached to a case, an attachment member which is inserted into the attachment hole of the base member so as to be attached to an inner surface of the base member located on an inner side of the case, and a terminal which is provided on the attachment member and exposed from the inner surface of the base member and an outer surface opposite to the inner surface.

20 Claims, 10 Drawing Sheets

(56) References Cited

U.S. PATENT DOCUMENTS

| | | | | |
|---|---|---|---|---|
| 2003/0231552 | A1 | 12/2003 | Markart | |
| 2017/0212474 | A1* | 7/2017 | Iguchi | G04B 37/084 |
| 2019/0006775 | A1 | 1/2019 | Kan et al. | |
| 2019/0051975 | A1* | 2/2019 | Hasei | G04R 60/12 |
| 2019/0103757 | A1 | 4/2019 | Kitazawa | |
| 2020/0161603 | A1 | 5/2020 | Enomoto et al. | |
| 2020/0301368 | A1* | 9/2020 | Hurni | G04B 47/044 |

FOREIGN PATENT DOCUMENTS

| | | | |
|---|---|---|---|
| JP | 2007317583 | A | 12/2007 |
| JP | 2015174702 | A | 10/2015 |
| JP | 2019012590 | A | 1/2019 |
| JP | 2019029226 | A | 2/2019 |
| JP | 2019068629 | A | 4/2019 |
| JP | 2021005457 | A | 1/2021 |

OTHER PUBLICATIONS

JP Office Action dated Sep. 3, 2024 issued in JP 2023-067019.

Notice of Reasons for Refusal dated Jan. 21, 2025 received in Japanese Patent Application No. JP 2023-067019.

CN Second Office Action dated Jan. 11, 2025 issued in CN Appl 202210220931.7.

CN Second Office Action dated Mar. 24, 2025 issued in CN Appl 202210220931.7.

* cited by examiner

COMPONENT MOUNTING MEMBER, CASE AND TIMEPIECE

CROSS-REFERENCE TO RELATED APPLICATION

This application is based upon and claims the benefit of priority from the prior Japanese Patent Application No. 2021-039489, filed Mar. 11, 2021, the entire contents of which are incorporated herein by reference.

BACKGROUND

1. Technical Field

The technical field relates to a component mounting member that is used for electronic devices, such as timepieces, mobile phones, and portable information terminals, a case equipped with the component mounting member, and a timepiece equipped with the case.

2. Description of the Related Art

A wristwatch is known which has a structure where a communication module and a communication terminal are provided inside a housing which is a base member and made of a non-metal material such as synthetic resin, and a fixing ring is arranged surrounding the communication module and attached to a case by screws via the base member and a packing, as described in Japanese Patent Application Laid-Open (Kokai) Publication No. 2004-085232.

SUMMARY

One embodiment is a component mounting member comprising: a base member which is provided with an attachment hole and attached to a case; an attachment member which is inserted into the attachment hole of the base member so as to be attached to an inner surface of the base member located on an inner side of the case; and a terminal which is provided on the attachment member and exposed from the inner surface of the base member and an outer surface opposite to the inner surface.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment applied in a wristwatch will hereinafter be described with reference to FIG. 1 to FIG. 10.

Figure 1:
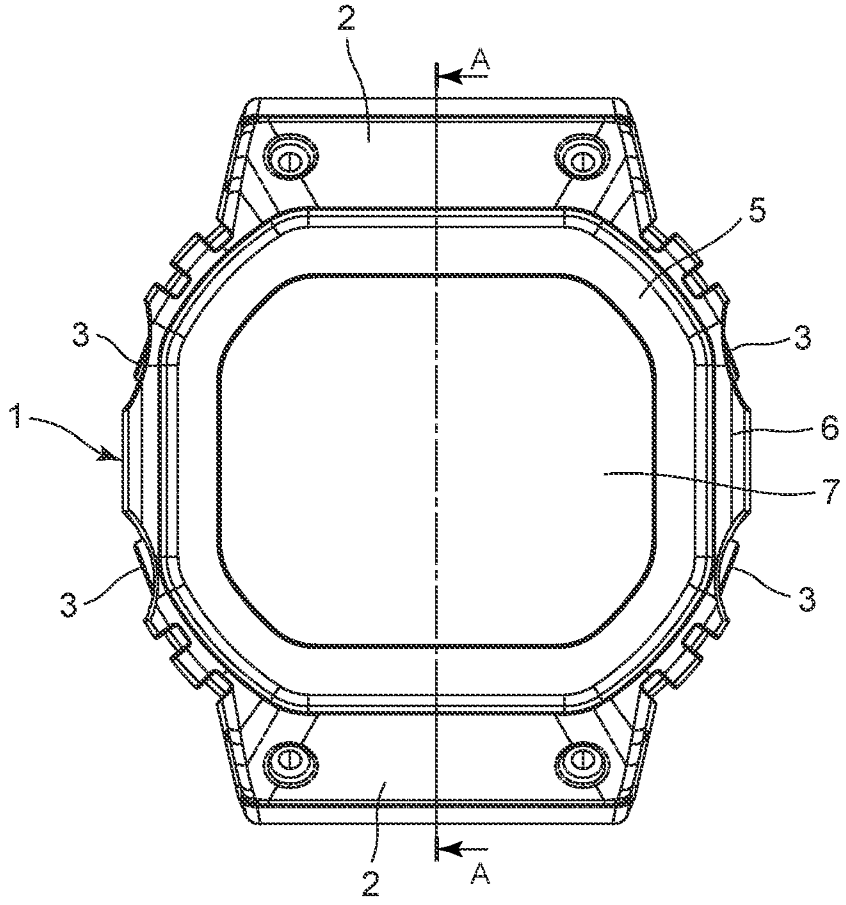
FIG. 1 is an enlarged front view of an embodiment of a wristwatch.
Figure 2:
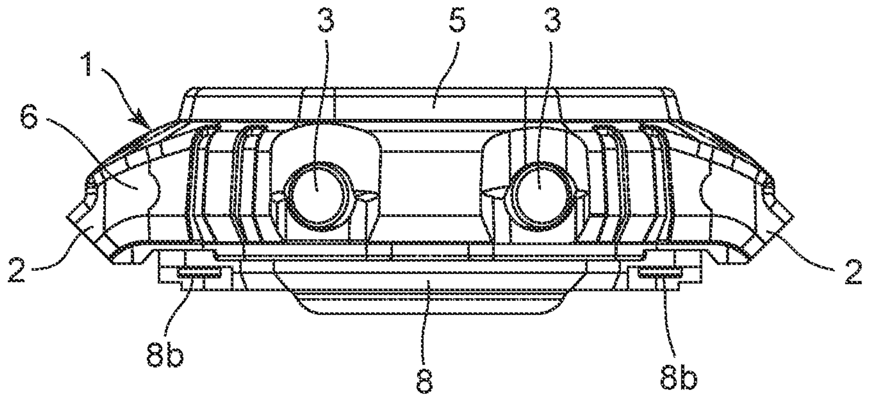
FIG. 2 is an enlarged side view of the wristwatch shown in FIG. 1.
Figure 3:
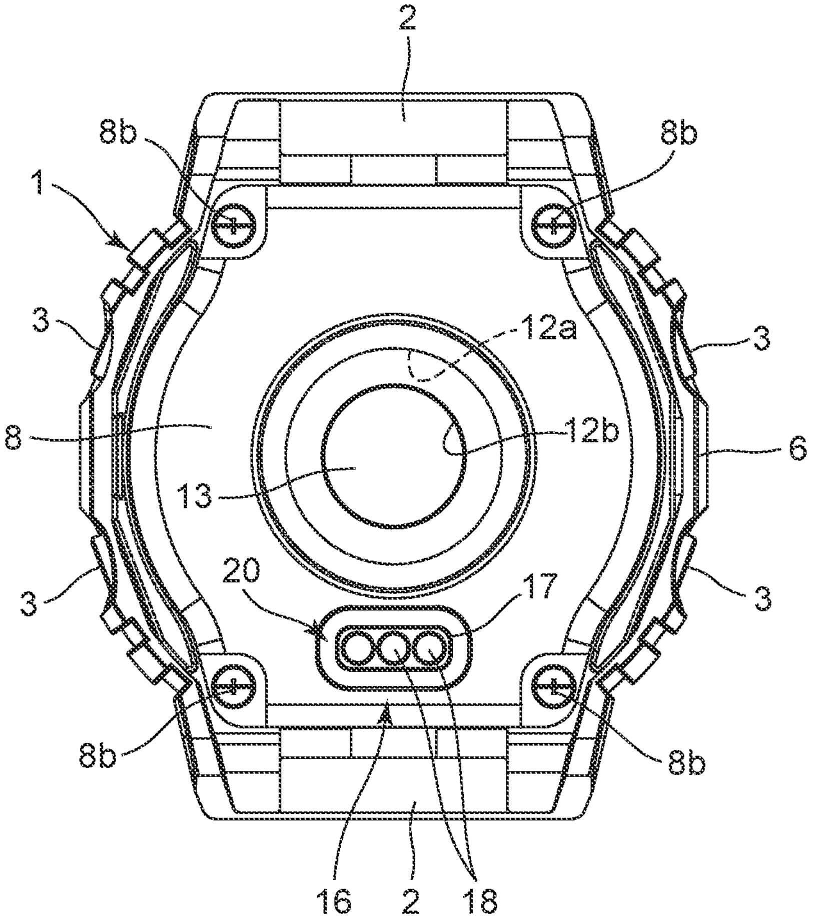
FIG. 3 is an enlarged rear view of the wristwatch shown in FIG. 1.

This wristwatch includes a wristwatch case 1, as shown in FIG. 1 to FIG. 3. On the six o'clock side and twelve o'clock side of the wristwatch case 1, band attachment sections 2 are provided to which watch bands (not shown) are attached. In addition, on the two o'clock side, four o'clock side, eight o'clock side, and ten o'clock side of the wristwatch case 1, switch sections 3 are provided.

This wristwatch case 1 includes a main body case 4, a first exterior case 5, and a second exterior case 6, as shown in FIG. 1 to FIG. 4. The main body case 4 is made of a lightweight and high-strength synthetic resin acquired by carbon fiber or glass fiber being mixed into a highly rigid polyamide resin. In the circumferential portion of the main body case 4, a metal reinforcement member 4*a* is embedded, and part of which protrudes into the inside of the main body case 4. Note that this main body case 4 is not necessarily required to be formed using synthetic resin and may be formed using metal.

The first exterior case 5 is made of a highly rigid metal such as stainless steel or titanium alloy, and arranged covering the upper outer surface of the main body case 4, as shown in FIG. 1 to FIG. 4. On the other hand, the second exterior case 6 is made of an elastic synthetic resin such as urethane resin. This second exterior case 6 is structured to be mounted on the outer circumferential portion of the main body case 4 and hold down a foot section 5*a* of the first exterior case 5 with the first exterior case 5 being exposed.

Figure 4:
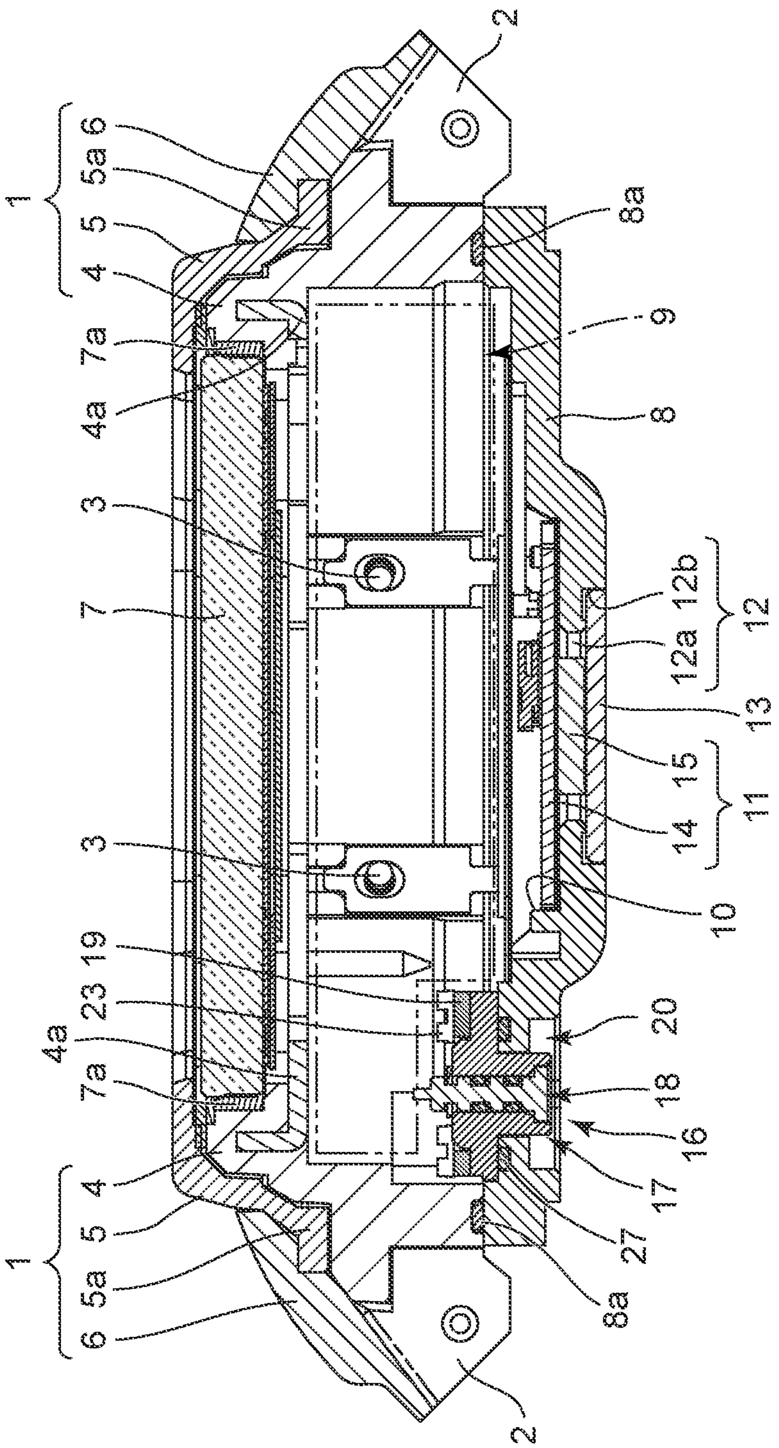
FIG. 4 is an enlarged cross-sectional view of the wristwatch taken along the A-A arrow view in FIG. 1.

To the upper opening of the wristwatch case 1, that is, to the upper opening of the main body case 4, a watch glass 7 is attached via a glass packing 7*a*, as shown in FIG. 1 and FIG. 4. Also, to the lower part of the wristwatch case 1, that is, to the lower part of the main body case 4, a back cover 8 is attached by a plurality of screws 8*b* via a waterproof ring 8*a*. Inside this wristwatch case 1, a timepiece module 9 is provided, as shown in FIG. 4. Although not shown in the drawing, this timepiece module 9 has various components necessary for timepiece functions, such as a timepiece movement for driving pointers to indicate a time of day, a display section for electro-optically displaying various types of information regarding a time of day, a date, a day of the week, and the like, a circuit section for electrically controlling these sections, and a rechargeable battery for supplying electric power to the circuit section.

The back cover 8 in this embodiment is made of a highly rigid metal such as stainless steel or titanium alloy, as shown in FIG. 3 to FIG. 6. This back cover 8 has a substantially quadrilateral plate shape whose three o'clock side portion and nine o'clock side portion each project in an arc shape. A center portion of the back surface (undersurface in FIG. 4) of this back cover 8 project rearward, and a concave sensor housing section 10 is provided in the inner surface (upper surface in FIG. 4) of this projecting center portion.

Figure 5:
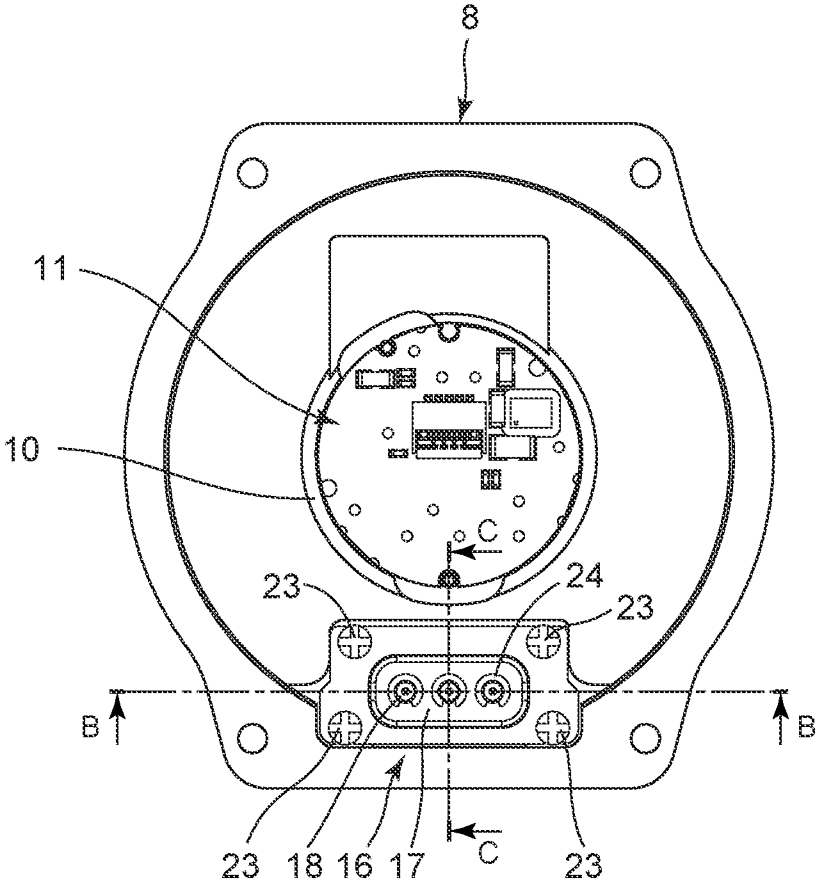
FIG. 5 is an enlarged planar view showing the inner surface side of a back cover for the wristwatch shown in FIG. 3.
Figure 6:
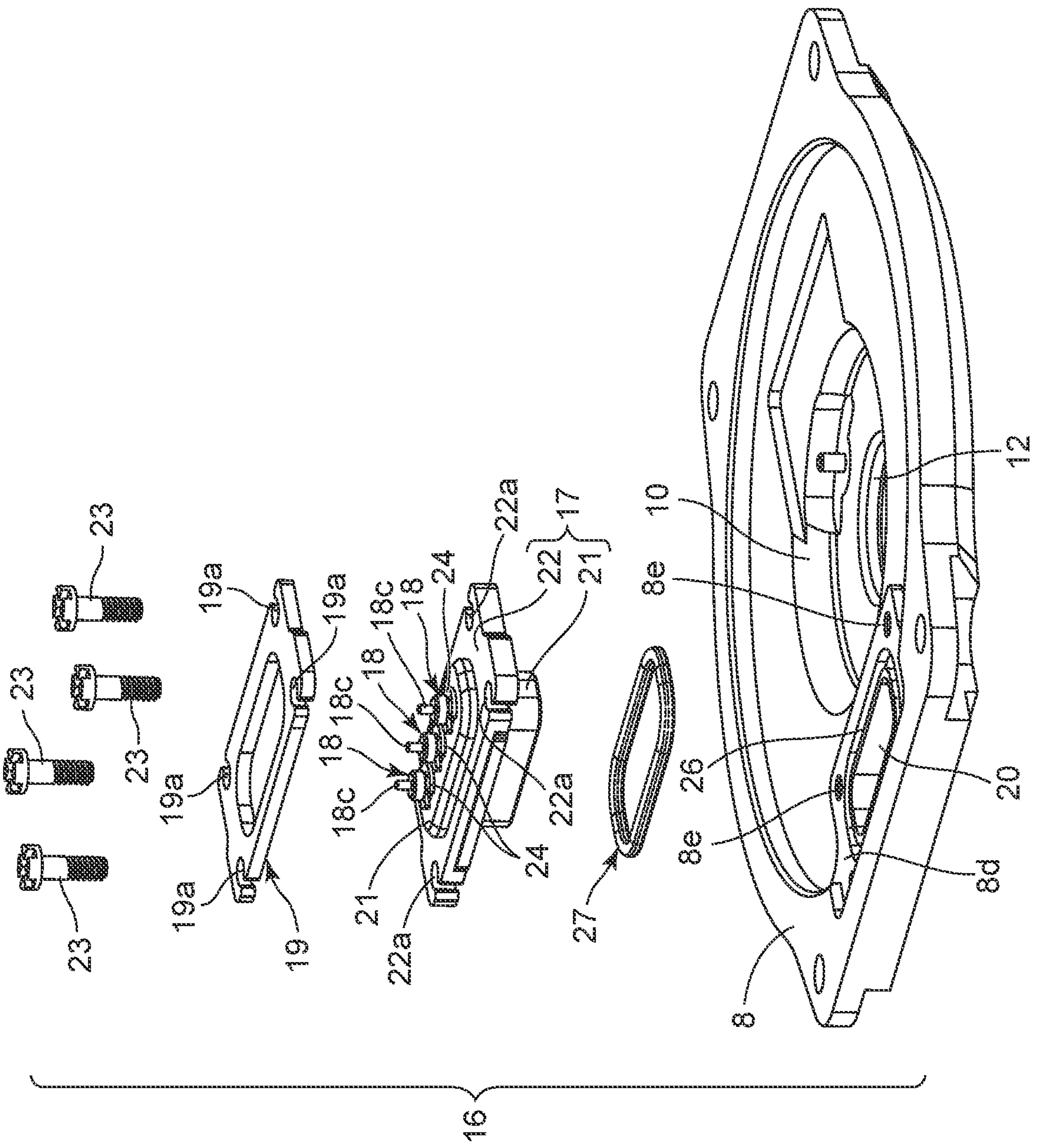
FIG. 6 is an enlarged perspective view of the back cover shown in FIG. 5, in which a charging terminal section has been disassembled.

In the sensor housing section 10, a pulse sensor 11 is provided, as shown in FIG. 4 to FIG. 6. In this embodiment, in the bottom part of the sensor housing section 10, a circular opening section 12 is formed penetrating vertically. This opening section 12 includes a small-diameter hole 12*a* located close to the inner side of the sensor housing section 10 and a large-diameter hole 12*b* located on the undersurface side of the back cover 8, that is, the back surface side of the back cover 8, which are coaxially provided. Into the large-diameter hole 12*b* of the opening section 12, a protective glass 13 is fitted.

The pulse sensor 11 includes a sensor board 14 and a sensor section 15, as shown in FIG. 4 and FIG. 5. The sensor board 14 is arranged on the bottom of the sensor housing section 10 and electrically connected to the circuit section (not shown) of the timepiece module 9. The sensor section 15, which includes alight emitting element and a light receiving element (not shown in the drawings), is provided on the undersurface of the sensor board 14 and arranged in the small-diameter hole 12*a* of the opening section 12.

As a result, the pulse sensor 11 is structured such that, light emitted by the light emitting element of the sensor section 15 is applied to blood vessels under the skin of an arm through the protective glass 13, reflected light resulting from the emitted light is received by the light receiving element of the sensor section 15 through the protective glass 13, and a pulse is detected on the basis of variation in the amount of the received light, as shown in FIG. 4.

The wristwatch case 1 is provided with a component mounting member 16, as shown in FIG. 3 to FIG. 5. This component mounting member 16 includes the back cover 8 which is a base member, a terminal attachment member 17 which is an attachment member attached to the six o'clock side of the upper surface of the back cover 8, or in other words, the six o'clock side of the inner surface of the back cover 8, a plurality of charging terminals 18 attached to the terminal attachment member 17, and a reinforcing plate 19 for reinforcing the terminal attachment member 17, as shown in FIG. 6, FIG. 7A, and FIG. 7B.

Figure 7A:
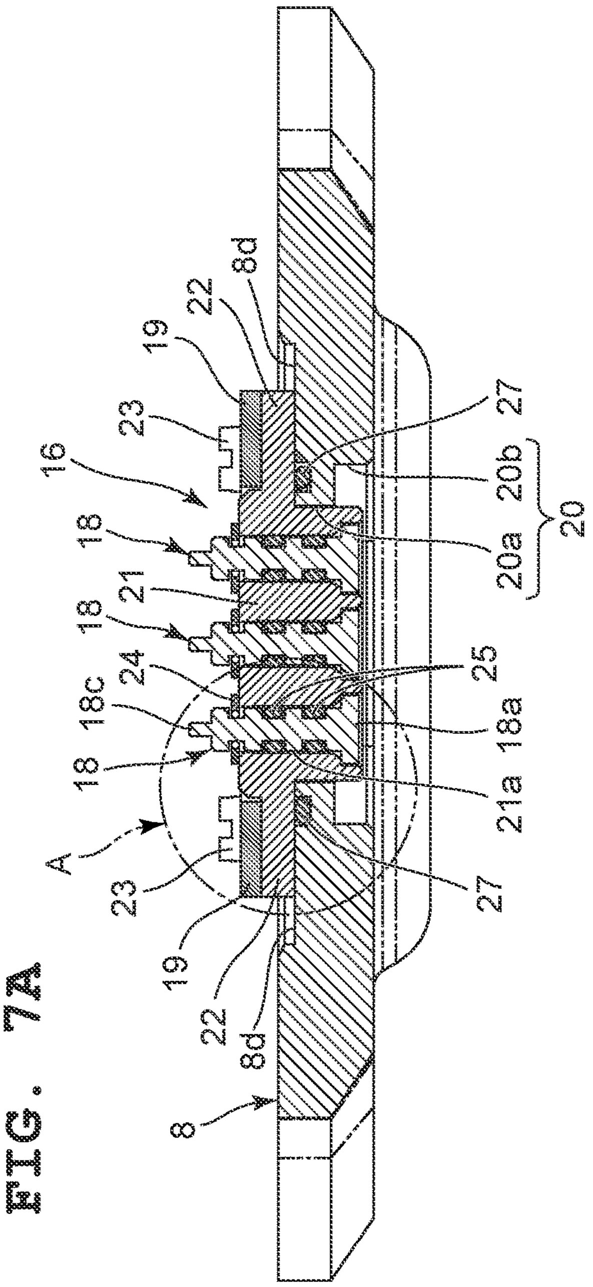
FIG. 7A is an enlarged cross-sectional view of the charging terminal section of the back cover taken along the B-B arrow view in FIG. 5.
Figure 7B:
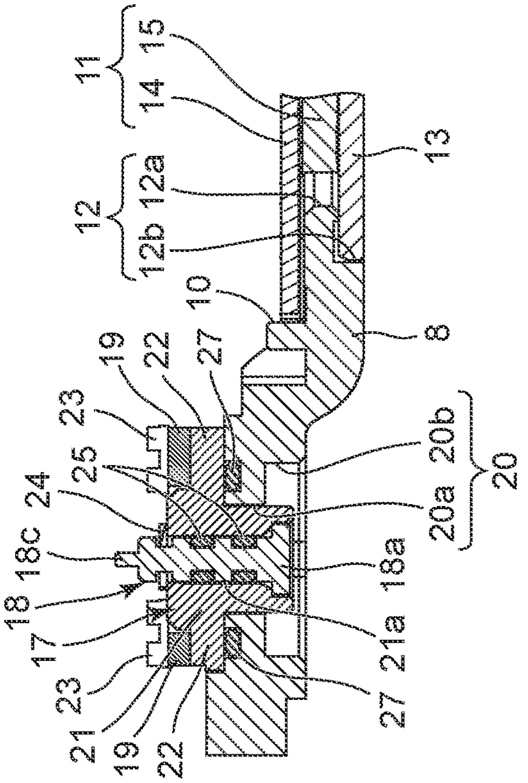
FIG. 7B is an enlarged cross-sectional view of the charging terminal section of the back cover taken along the C-C arrow view in FIG. 5.

In this embodiment, on the six o'clock side of the back cover 8, an attachment hole 20 where the terminal attachment member 17 is arranged is formed penetrating from the upper surface of the back cover 8 to the lower surface thereof which is the outer surface (back surface), as shown in FIG. 6, FIG. 7A, and FIG. 7B. This attachment hole 20 is a substantially rectangular through hole which is long from the five o'clock side to the seven o'clock side and of which the four corners have been rounded in arc shapes. As a result, this attachment hole 20 has a substantially oblong shape. Also, this attachment hole 20 includes a small-diameter hole section 20*a* located on the upper surface side (inner surface side) of the back cover 8 and a large-diameter hole section 20*b* located on the undersurface side (outer surface side) of the back cover 8.

The terminal attachment member 17 is made of an insulating non-metal material such as synthetic resin, as shown in FIG. 6, FIG. 7A, and FIG. 7B. This terminal attachment member 17 includes a main body section 21 to which the plurality of charging terminals 18 is attached, and a flange section 22 provided on the outer circumferential portion of the main body section 21. The main body section 21 is structured to be arranged in the attachment hole 20 of the back cover 8.

More specifically, the main body section 21 is formed to have a substantially oblong outer shape which is the same as the shape of the inner circumferential surface of the small-diameter hole section 20*a* of the attachment hole 20 in the back cover 8, as shown in FIG. 6, FIG. 7A, and FIG. 7B. Also, the main body section 21 is formed such that its thickness in a vertical direction is greater than the length (depth) of the attachment hole 20 of the back cover 8 in the vertical direction and substantially equal to the thickness of the six o'clock side of the back cover 8 in the vertical direction. In this main body section 21, a plurality of through holes 21*a* to which the plurality of charging terminals 18 is attached is formed at regular intervals along a longitudinal direction of the main body section 21.

The flange section 22 is formed to have a substantially rectangular outer shape which is larger than the shape of the inner circumferential surface of the large-diameter hole section 20*b* of the attachment hole 20 in the back cover 8, as shown in FIG. 6, FIG. 7A, and FIG. 7B. This flange section 22 is provided on the outer circumferential portion of the main body section 21 such that the undersurface of the flange section 22 is arranged on the counterbore surface of a counterbore section 8*d* on the upper surface of the back cover 8 when the lower part of the main body section 21 is arranged in the small-diameter hole section 20*a* and the large-diameter hole section 20*b* of the attachment hole 20 in the back cover 8.

Also, this flange section 22 is formed such that its thickness in the vertical direction is about one-third of the thickness of the main body section 21 in the vertical direction, and is structured such that the upper part of the main body section 21 protrudes above the upper surface of the flange section 22, as shown in FIG. 6, FIG. 7A, and FIG. 7B. In this embodiment, in the four corners of the flange section 22, first insertion holes 22*a* are formed into which a plurality of screw members 23 is inserted.

The plurality of charging terminals 18 is each formed in a substantially round stick shape so as to be inserted into the plurality of through holes 21*a* formed in the main body section 21 of the terminal attachment member 17, as shown in FIG. 6 to FIG. 8B. More specifically, each charging terminal 18 is formed such that its outer diameter is substantially equal to the inner diameter of the corresponding through hole 21*a* of the main body section 21 and its length in the vertical direction is longer than the length (thickness) of the main body section 21 in the vertical direction.

In this embodiment, on the lower end of each of the plurality of charging terminals 18, a head section 18*a* whose outer diameter is large is provided so that each charging terminal 18 is not slipped out, as shown in FIG. 7A to FIG. 8B. Accordingly, in the lower part of each through hole 21*a* in the main body section 21, a hole section 21*b* is formed of which the diameter is large and into which the corresponding head section 18*a* is inserted. Also, in an upper end portion of each of the plurality of charging terminals 18, a stopper groove 18*b* is annularly formed to which a stopper member 24 such as an E ring is attached.

As a result, the plurality of charging terminals 18 is structured such that, when they are inserted from below into the plurality of through holes 21*a* formed in the main body section 21 and their head sections 18*a* are arranged in the large-diameter hole sections 21*b* of the through holes 21*a*, the stopper grooves 18*b* in their upper end portions are exposed above the main body section 21, and the stopper members 24 are attached to the exposed stopper grooves 18*b*, as shown in FIG. 7A and FIG. 7B.

That is, the plurality of charging terminals 18 is structured not to be vertically slipped out from the through holes 21*a* of the main body section 21 with the head sections 18*a* on their lower ends being exposed from the attachment hole 20 of the back cover 8 on the undersurface side of the back cover 8, that is, the outer surface side of the back cover 8 and their upper ends being exposed on the upper surface side of the back cover 8, that is, the inner surface side of the back cover 8, as shown in FIG. 7A and FIG. 7B.

In this embodiment, on the upper ends of the plurality of charging terminals 18, small-diameter connection projections 18*c* which are electrically connected to the circuit section (not shown) of the timepiece module 9 in the wristwatch case 1 are provided, as shown in FIG. 6 to FIG. 8B. Also, in each outer circumferential surface of the plurality of charging terminals 18, a plurality of waterproof grooves 18*d* is annularly formed.

In these waterproof grooves 18*d*, waterproof rings 25 are provided, as shown in FIG. 7A to FIG. 8B. These waterproof rings 25 are structured such that their portions exposed from the waterproof grooves 18*d* come in pressure contact with the inner circumferential surface of the corresponding through hole 21*a* in the main body section 21, so that waterproofing between the outer circumferential surface of each charging terminal 18 and the inner circumferential surface of the corresponding through hole 21*a* in the main body section 21 can be achieved.

On the other hand, the reinforcing plate 19 is made of a highly rigid metal such as stainless steel, and has a frame shape which is the same as the shape of the flange section 22 of the terminal attachment member 17, as shown in FIG. 6, FIG. 7A, and FIG. 7B. In addition, this reinforcing plate 19 is formed such that its thickness in the vertical direction is equal to the vertical length (height) of a portion of the main body section 21 upwardly protruding from the upper surface of the flange section 22. In the four corners of the reinforcing plate 19, second insertion holes 19*a* into which the plurality of screw members 23 is inserted are formed coaxially corresponding to the plurality of first insertion holes 22*a* formed in the flange section 22 of the terminal attachment member 17.

In this embodiment, in the counterbore surface of the counterbore section 8*d* on the upper surface of the back cover 8, a plurality of screw holes 8*e* into which the plurality of screw members 23 is screwed is formed coaxially corresponding to the plurality of first insertion holes 22*a* in the flange section 22 of the terminal attachment member 17 and the plurality of second insertion holes 19*a* in the reinforcing plate 19, as shown in FIG. 6. These screw holes 8*e* are formed only on the upper surface side of the back cover 8 without vertically penetrating through the back cover 8.

As a result, the reinforcing plate 19 is structured such that, when the plurality of screw members 23 is inserted into the plurality of second insertion holes 19*a* from the inner surface side of the back cover 8, that is, when the plurality of screw members 23 is inserted thereinto from above, and screwed into the screw holes 8*e* of the back cover 8 through the first insertion holes 22*a* of the flange section 22 of the terminal attachment member 17, this reinforcing plate 19 is attached while pressing the flange section 22 against the upper surface of the back cover 8, as shown in FIG. 6.

That is, the above-described reinforcing plate 19 is structured such that, when the plurality of screw members 23 is screwed into the screw holes 8*e* of the back cover 8 and tightened, the entire undersurface of this reinforcing plate evenly presses the flange section 22 of the terminal attachment member 17 made of synthetic resin against the counterbore surface of the counterbore section 8*d* of the back cover 8, whereby the terminal attachment member 17 is reliably and firmly fixed to the inner surface of the back cover 8 without being partially deformed, as shown in FIG. 6, FIG. 7A, and FIG. 7B.

As a result of this structure of the reinforcing plate 19 by which the flange section 22 of the terminal attachment member is evenly pressed by the entire undersurface of the reinforcing plate 19, the plurality of screw members 23 does not intensively presses on the flange section 22, so that the flange section 22 is not damaged by the plurality of screw members 23 even though the flange section 22 is made of an insulating synthetic resin, as shown in FIG. 6, FIG. 7A, and FIG. 7B.

In this embodiment, in the counterbore surface of the counterbore section 8*d* on the upper surface of the back cover 8, a packing groove 26 is formed in a manner to surround the main body section 21 of the terminal attachment member 17, as shown in FIG. 6 to FIG. 8B. More specifically, this packing groove 26 is formed in a substantially oblong annular shape along the rim of the small-diameter hole section 20*a* of the attachment hole 20 in the back cover 8, and located closer to the rim of the attachment hole 20 than the plurality of screw holes 8*e* in the counterbore surface of the counterbore section 8*d* on the upper surface of the back cover 8 while avoiding these screw holes 8*e*.

Figure 8A:
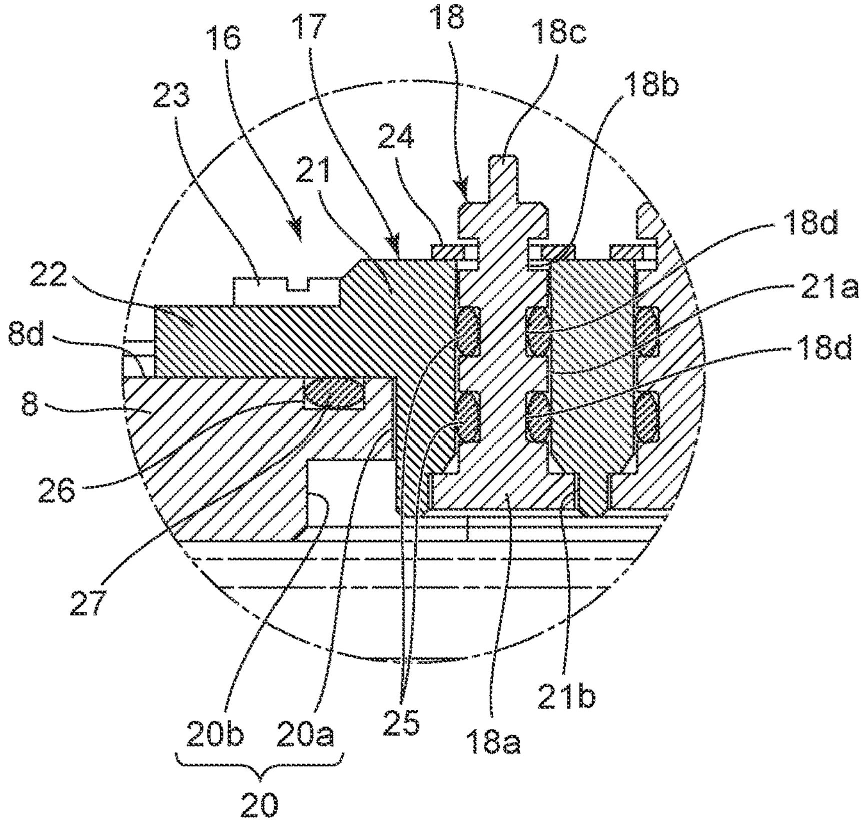
FIG. 8A is an enlarged cross-sectional view of an A portion of the charging terminal section shown in FIG. 7A.
Figure 8B:
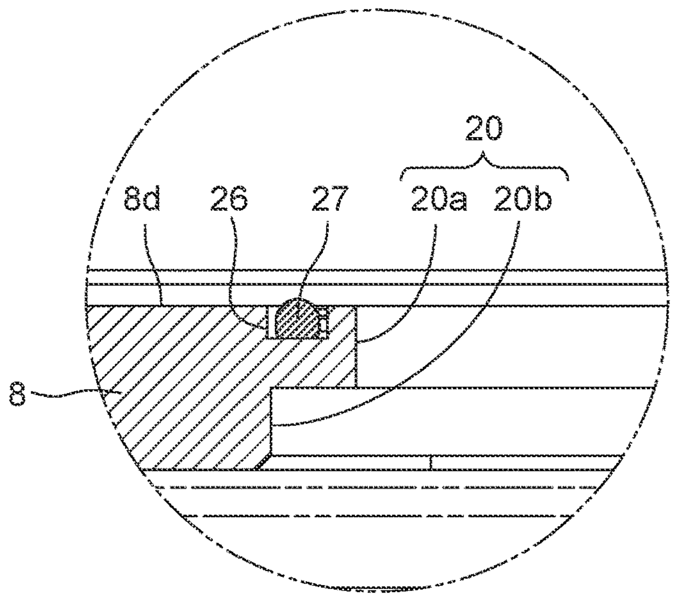
FIG. 8B is also an enlarged cross-sectional view of the A portion of the charging terminal section shown in FIG. 7A, in which a terminal attachment member has been detached from the back cover.

Into this packing groove 26, a waterproof packing 27 is fitted, as shown in FIG. 8A and FIG. 8B. This waterproof packing 27 has a D-shaped cross section. That is, its undersurface to be arranged on the bottom of the packing groove 26 is flat and its upper surface has a shape to protrude from the packing groove 26 in an arc shape.

The above-described waterproof packing 27 is structured such that, when the plurality of screw members 23 is tightened on the reinforcing plate 19 with the waterproof packing 27 being arranged in the packing groove 26, the upper surface of the waterproof packing 27 protruding in an arc shape from the packing groove 26 is pressed into the packing groove 26 by the flange section 22 of the terminal attachment member 17, as shown in FIG. 8A and FIG. 8B.

As a result of this structure, the waterproof packing 27 achieves waterproofing between the upper surface of the back cover 8, or more specifically, the counterbore surface of the counterbore section 8*d* of the back cover 8 and the undersurface of the flange section 22 of the terminal attachment member 17, as shown in FIG. 6 to FIG. 8B. In this embodiment, the packing groove 26 has a substantially oblong outer shape whose four corners have been rounded in arc shapes, and the waterproof packing 27 is arranged to fill the entire packing groove 26 including these rounded four corners so as to unfailingly and favorably achieve waterproofing between the upper surface of the back cover 8, or more specifically, the counterbore surface of the counterbore section 8*d* of the back cover 8 and the undersurface of the flange section 22 of the terminal attachment member 17.

Figure 9:
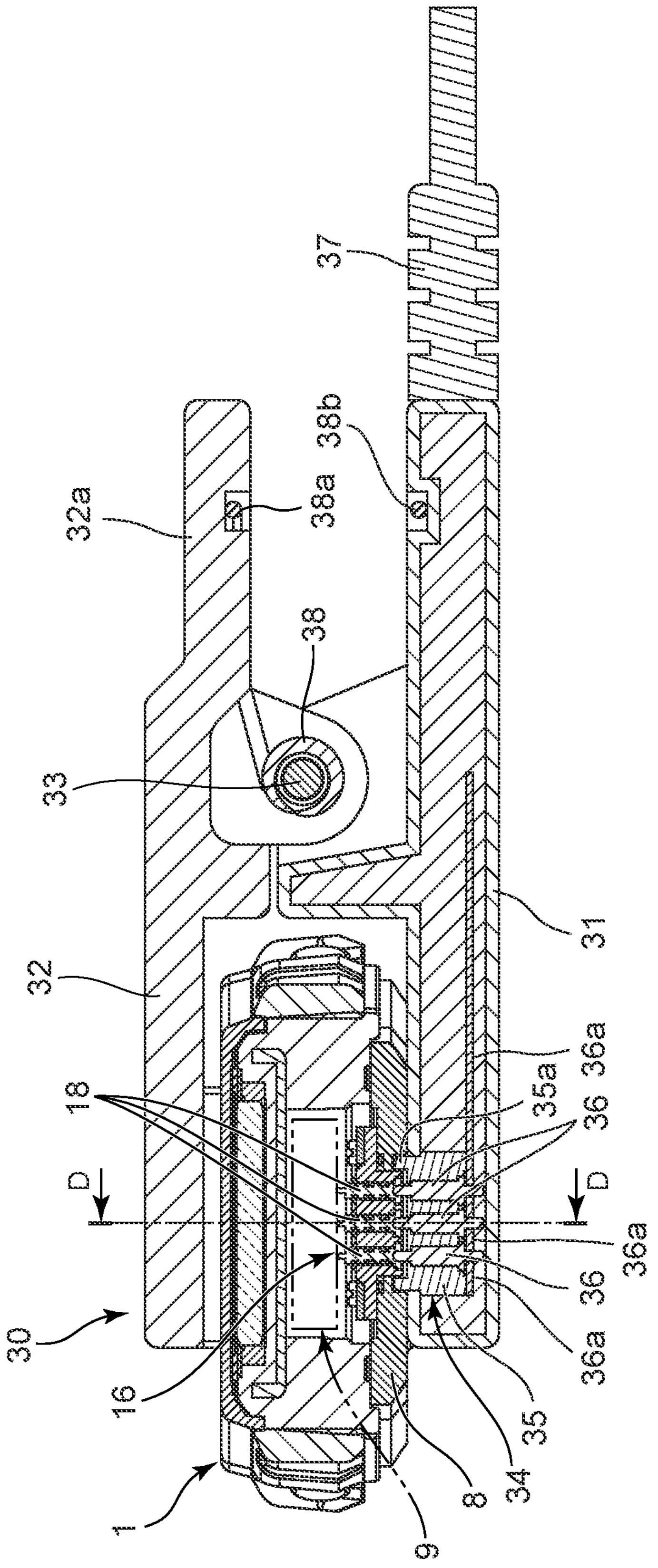
FIG. 9 is an enlarged cross-sectional view of the wristwatch of FIG. 4 which is being charged by a battery charger.
Figure 10:
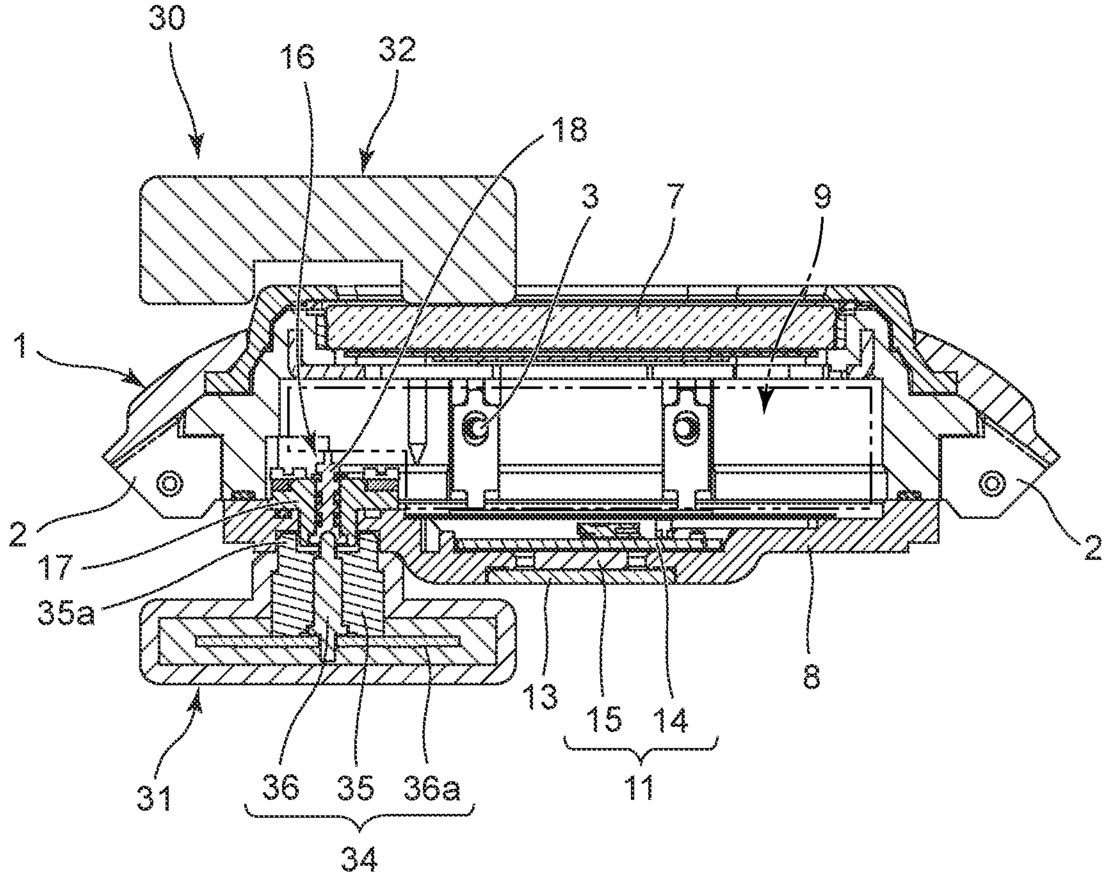
FIG. 10 is an enlarged cross-sectional view of the wristwatch taken along the D-D arrow view in FIG. 9 with it being charged.

The component mounting member 16 is structured such that a battery charging device 30 which charges the rechargeable battery (not shown) of the timepiece module 9 is connected to this component mounting member 16, as shown in FIG. 9 and FIG. 10. This battery charging device 30, which has an alligator-mouth shape, includes a device main body 31 and a hold-down section 32, and is structured such that the device main body 31 and the hold-down section 32 are rotatably coupled to each other by a holding shaft 33.

The device main body 31 includes a connection section 34 which is connected to the component mounting member 16, as shown in FIG. 9 and FIG. 10. This connection section 34 includes a position restriction section 35 which is inserted into the large-diameter hole section 20*b* of the attachment hole 20 in the back cover 8 while avoiding an area corresponding to the main body section 21 of the terminal attachment member 17, and a plurality of electrode terminals 36 which is provided in the position restriction section 35 and comes in contact with and electrically connected to the plurality of charging terminals 18 of the component mounting member 16.

In this embodiment, the position restriction section 35 is provided protruding outward from the inside of the device main body 31, and a frame-shaped projection 35*a* is provided on the leading end of this protruding portion, as shown in FIG. 9 and FIG. 10. This frame-shaped projection 35*a* is formed such that its outer circumferential surface has the same shape as the inner circumferential surface of the large-diameter hole section 20*b* of the attachment hole 20 in the back cover 8, and its inner circumferential surface has the same shape as the outer circumferential surface of the lower part of the main body section 21 of the terminal attachment member 17.

As a result, the position restriction section 35 is structured to restrict the position of the device main body 31 with respect to the back cover 8 by the frame-shaped projection 35*a* on the leading end of the position restriction section 35 being held between the inner circumferential surface of the large-diameter hole section 20*b* of the attachment hole 20 in the back cover 8 and the outer circumferential surface of the lower part of the main body section 21 of the terminal attachment member 17 when the frame-shaped projection 35*a* is inserted into the large-diameter hole section 20*b* of the attachment hole 20 in the back cover 8, as shown in FIG. 9 and FIG. 10.

The plurality of electrode terminals 36 is provided by being embedded in the inner area of the position restriction section 35 while corresponding to the plurality of charging terminals 18 of the component mounting member 16 with the leading ends of these electrode terminals 36 protruding and being exposed inside the frame-shaped projection 35*a* of the position restriction section 35, as shown in FIG. 9 and FIG. 10. As a result, this plurality of electrode terminals 36 is structured to be pressed corresponding to and against the undersurfaces of the head sections 18*a* on the lower ends of the plurality of charging terminals 18 of the component mounting member 16.

In this embodiment, the plurality of electrode terminals 36 is connected to an A/C converter (not shown) in the device main body 31 via lead wires 36*a*, as shown in FIG. 9 and FIG. 10. To this A/C converter, a power cord 37 is connected. As a result, the plurality of electrode terminals 36 is structured to supply electric power supplied from the power cord 37 and converted in the A/C converter to the plurality of charging terminals 18 of the component mounting member 16.

On the other hand, the hold-down section 32 of the battery charging device 30 is to hold down the wristwatch case 1 on the device main body 31 so as to pinch the wristwatch case 1, and is rotatably attached to the device main body 31 by the holding shaft 33, as shown in FIG. 9 and FIG. 10. On the end of this hold-down section 32 on the holding shaft 33 side, a lever section 32*a* is provided projecting rightward relative to the holding shaft 33 in FIG. 9.

In this embodiment, the hold-down section 32 is forced in a direction to be rotated toward the device main body 31 by a spring member 38 provided around the holding shaft 33, as shown in FIG. 9 and FIG. 10. This spring member 38, which is a coil spring provided on the outer circumferential surface of the holding shaft 33, is structured such that its one end portion 38*a* engages with the hold-down section 32 and the other end portion 38*b* engages with the device main body 31.

As a result, the battery charging device 30 is structured such that, when the lever section 32*a* of the hold-down section 32 is pressed against the spring force of the spring member 38, the hold-down section 32 is rotated in a direction away from the device main body 31, the space between the device main body 31 and the hold-down sections 32 is increased, and the wristwatch case 1 is arranged between the device main body 31 and the hold-down section 32 in this state, as shown in FIG. 9 and FIG. 10.

Also, this battery charging device 30 is structured such that, when the wristwatch case 1 is arranged between the device main body 31 and the hold-down section 32, the hold-down section 32 is rotated centering on the holding shaft 33 by the spring force of the spring member 38, and presses the wristwatch case 1 against the device main body 31 so as to cause the plurality of electrode terminals 36 to be pressed against the plurality of charging terminals 18 of the component mounting member 16, whereby the rechargeable battery (not shown) of the timepiece module 9 mounted in the wristwatch case 1 is charged in this state, as shown in FIG. 9 and FIG. 10.

Next, the assembly of the component mounting member 16 for this wristwatch is described.

In this assembly, first, the plurality of charging terminals 18 is attached to the terminal attachment member 17. Here, before this attachment, the waterproof rings 25 are attached to the plurality of waterproof grooves 18*d* formed in the outer circumferential surfaces of the plurality of charging terminals 18. In this state, the plurality of charging terminals 18 is inserted from below into the plurality of through holes 21*a* formed in the main body section 21 of the terminal attachment member 17.

Accordingly, the head sections 18*a* of the plurality of charging terminals 18 are arranged in the large-diameter hole sections 21*b* formed in the lower parts of the through holes 21*a* in the main body section 21. Consequently, the connection projections 18*c* on the upper ends of the plurality of charging terminals 18 protrude above the main body section 21, and the stopper grooves 18*b* of the plurality of charging terminals 18 are exposed above the main body section 21. In this state, the stopper members 24 are attached to the stopper grooves 18*b* of the plurality of charging terminals 18. As a result, the plurality of charging terminals 18 is attached to the main body section 21 without being vertically slipped out from the through holes 21*a* of the main body section 21.

Then, the terminal attachment member 17 having the plurality of charging terminals 18 attached thereto is attached to the attachment hole 20 formed on the six o'clock side of the back cover 8. Here, before this attachment, the waterproof packing 27 is arranged in the packing groove 26 formed in the counterbore section 8*d* on the upper surface of the back cover 8. More specifically, by having the D-shaped cross section, that is, by having the flat undersurface and the arc-shaped upper surface, the waterproof packing 27 is arranged such that its bottom surface is arranged on the bottom of the packing groove 26 and its arc-shaped upper surface is arranged protruding from the packing groove 26.

In this state, the main body section 21 of the terminal attachment member 17 is inserted into the small-diameter hole section 20*a* of the attachment hole 20 of the back cover 8 from the upper surface side (inner surface side) of the back cover 8, whereby the flange section 22 provided on the outer circumferential portion of the main body section 21 is placed on the arc-shaped upper surface of the waterproof packing 27 protruding from the counterbore surface of the counterbore section 8*d* provided on the upper surface of the back cover 8. That is, the flange section 22 is arranged in a slightly floating state above the counterbore surface of the counterbore section 8*d* of the back cover 8.

Here, the lower part of the main body section 21 is arranged in a slightly floating state in the large-diameter hole section 20*b* of the attachment hole 20 in the back cover 8 and the upper part of the main body section 21 is arranged protruding above the flange section 22. In addition, the plurality of first insertion holes 22*a* formed in the four corners of the flange section 22 coaxially correspond to the plurality of screw holes 8*e* formed in the four corners of the counterbore section 8*d* of the back cover 8.

In this state, the reinforcing plate 19 is arranged on the flange section 22 such that the plurality of second insertion holes 19*a* formed in the four corners of the reinforcing plate 19 coaxially correspond to the plurality of first insertion holes 22*a* formed in the four corners of the flange section 22 and the plurality of screw holes 8*e* formed in the four corners of the counterbore section 8*d* of the back cover 8. Then, from above the reinforcing plate 19, that is, from above the upper surface side of the back cover 8, the plurality of screw members 23 is inserted into the second insertion holes 19*a* of the reinforcing plate 19 and the first insertion holes 22*a* of the flange section 22, and screwed into the plurality of screw holes 8*e* in the counterbore section 8*d* of the back cover 8 so as to be tightened.

Accordingly, by the plurality of screw members 23 being tightened, the flange section 22 of the terminal attachment member 17 is pressed against the counterbore surface of the counterbore section 8*d* of the back cover 8 by the reinforcing plate 19. Here, the flange section 22 of the terminal attachment member 17, which is made of synthetic resin, is evenly pressed against the counterbore surface of the counterbore section 8*d* of the back cover 8 by the entire undersurface of the reinforcing plate 19. Therefore, the terminal attachment member 17 is prevented from being partially deformed, and reliably and firmly fixed to the inner surface of the back cover 8.

As a result of this structure, even though the flange section 22 of the terminal attachment member 17 is made of an insulating synthetic resin, the plurality of screw members 23 does not bite into the flange section 22 since the entire undersurface of the reinforcing plate 19 evenly presses the flange section 22 and the flange section 22 is not partially pressed by the plurality of screw members 23. Therefore, damages to the flange section 22 due to the plurality of screw members 23 can be prevented.

Also, here, the undersurface of the flange section 22 presses the arc-shaped upper surface of the waterproof packing 27 protruding from the counterbore surface of the counterbore section 8*d* of the back cover 8 into the packing groove 26. Consequently, the undersurface of the flange section 22 comes in close contact with the counterbore surface of the counterbore section 8*d* of the back cover 8, and the lower part of the main body section 21 is arranged at its proper position in the large-diameter hole section 20*b* of the attachment hole 20 in the back cover 8. As a result, the terminal attachment member 17 is attached to the back cover 8, whereby the assembly of the component mounting member 16 is completed.

Next, the pulse sensor 11 is arranged in the sensor housing section 10 formed in the central portion of the back cover 8. Here, before this arrangement, the protective glass 13 is fitted into the large-diameter hole 12*b* of the opening section 12 of the back cover 8. In this state, the sensor section 15 provided on the sensor board 14 of the pulse sensor 11 is arranged in the small-diameter hole 12*a* of the opening section 12 of the back cover 8, whereby the sensor board 14 is arranged and fixed in the sensor housing section 10. As a result, the pulse sensor 11 is attached to the back cover 8.

Then, the timepiece module 9 is mounted in the wristwatch case 1, and the back cover 8 is attached to the lower part of the wristwatch case 1 together with the waterproof ring 8*a*. Here, the connection projections 18*c* of the plurality of charging terminals 18 of the component mounting member 16 and the sensor board 14 of the pulse sensor 11 are electrically connected to the circuit section (not shown) of the timepiece module 9. As a result, the assembly of the wristwatch which can be charged by the battery charging device 30 is completed.

Next, the battery charging of the wristwatch by the battery charging device 30 is described.

When the wristwatch is to be charged, the lever section 32*a* of the hold-down section 32 of the battery charging device 30 is pressed against the spring force of the spring member 38. As a result, the hold-down section 32 is rotated in the direction away from the device main body 31, and the space between the device main body 31 and the hold-down sections 32 is increased. Then, in this state, the wristwatch case 1 is arranged between the device main body 31 and the hold-down section 32.

Here, the frame-shaped projection 35*a* of the position restriction section 35 provided outwardly protruding from the inside of the device main body 31 is positioned corresponding to the large-diameter hole section 20*b* of the attachment hole 20 of the back cover 8. In this state, the hold-down section 32 is rotated centering on the holding shaft 33 by the spring force of the spring member 38 so as to press the wristwatch case 1 against the device main body 31. As a result, the frame-shaped projection 35*a* of the position restriction section 35 is inserted into the large-diameter hole section 20*b* of the attachment hole 20 of the back cover 8.

Here, the frame-shaped projection 35*a* is held between the inner circumferential surface of the large-diameter hole section 20*b* of the attachment hole 20 of the back cover 8 and the outer circumferential surface of the lower part of the main body section 21 of the terminal attachment member 17, whereby the position of the device main body 31 with respect to the back cover 8 is fixed. In addition, the leading ends of the plurality of electrode terminals 36 embedded in the position restriction section 35 are pressed corresponding to and against the undersurfaces of the head sections 18*a* on the lower ends of the plurality of charging terminals 18 of the component mounting member 16.

As a result, the plurality of electrode terminals 36 of the battery charging device 30 is electrically connected to the plurality of charging terminals 18 of the component mounting member 16. Here, since the plurality of electrode terminals 36 has been connected to the A/C converter (not shown) in the device main body 31 by the lead wires 36*a*, electric power from the power cord 37 is converted by the A/C converter and supplied to the plurality of charging terminals 18 of the component mounting member 16, whereby the rechargeable battery (not shown) of the timepiece module 9 mounted in the wristwatch case 1 is charged. In the case of the wristwatch described in Japanese Patent Application Laid-Open (Kokai) Publication No. 2004-085232, the base member, which is made using a non-metal material such as synthetic resin, is required to be thickly formed so as to ensure its strength. Accordingly, this wristwatch has a problem in that it is thick as a whole and cannot be slimmed or downsized.

In contrast, the component mounting member 16 of the wristwatch according to the present embodiment includes the back cover 8 which is a rigid base member provided with the attachment hole 20 and attached to the wristwatch case 1, the terminal attachment member 17 with insulation properties which is inserted into the attachment hole 20 of the back cover 8 so as to be attached to the upper surface of the back cover 8, that is, the inner surface of the back cover 8 on the inner side of the wristwatch case 1, and the plurality of charging terminals 18 provided in the terminal attachment member 17 and exposed from the upper surface of the back cover 8 and the lower surface thereof opposite to the upper surface, that is, the outer surface thereof, whereby the wristwatch case 1 can be slimmed and downsized.

More specifically, in the component mounting member 16 of this wristwatch, the terminal attachment member 17 is made of an insulating material, whereby insulation between the plurality of charging terminals 18 and the back cover 8 can be achieved. In addition, even though the terminal attachment member 17 is formed to be thick in the vertical direction so as to ensure its strength, the back cover 8, which is formed using a rigid material, can be formed to be thin in the vertical direction because of the structure where the terminal attachment member 17 is attached to the upper surface of the back cover 8, that is, the inner surface of the back cover 8, whereby the entire wristwatch case 1 can be slimmed and downsized.

In the case of the component mounting member 16 of this wristwatch, since the back cover 8 serving as a base member is made of a highly rigid metal and the terminal attachment member 17 is made of an insulating non-metal material such as synthetic resin, the strength of the back cover 8 can be ensured even though the back cover 8 is thinly formed, whereby the slimming of the entire wristwatch case 1 can be achieved. In addition, since the terminal attachment member 17 is made of an insulating non-metal material, insulation between the plurality of charging terminals 18 and the back cover 8 can be reliably and favorably achieved, whereby electrically reliable products can be provided.

Also, in the component mounting member 16 of this wristwatch, the terminal attachment member 17 includes the main body section 21 which is arranged in the attachment hole 20 of the back cover 8 and to which the plurality of charging terminals 18 is attached, and the flange section 22 which is provided on the outer circumferential portion of the main body section 21 and arranged on the upper surface of the back cover 8, that is, the inner surface of the back cover 8. As a result of this structure, the main body section 21 which is arranged in the attachment hole 20 of the back cover 8 can be formed to be sufficiently thick in the vertical direction, whereby the plurality of charging terminals 18 can be reliably and favorably attached. In addition, by the flange section 22, the main body section 21 can be reliably and favorably attached to the back cover 8.

Moreover, in the component mounting member 16 of this wristwatch, the flange section 22 of the terminal attachment member 17 is attached to the upper surface of the back cover 8, that is, the inner surface of the back cover 8 by the plurality of screw members 23 being inserted through the reinforcing plate 19 arranged on the flange section 22. As a result of this structure, by being reinforced by the reinforcing plate 19, the flange section 22 can be reliably and firmly attached to the upper surface of the back cover 8 by the plurality of screw members 23 even though the flange section 22 is made of an insulating synthetic resin and is thin in the vertical direction.

More specifically, in the component mounting member 16 of this wristwatch, when the plurality of screw members 23 is screwed into the plurality of screw holes **8*e* of the back cover 8 and tightened, the entire lower surface of the reinforcing plate 19 evenly presses the flange section 22 of the terminal attachment member 17 made of synthetic resin against the counterbore surface of the counterbore section 8*d* on the upper surface of the back cover 8 by surface contact. As a result of this structure, the terminal attachment member 17 is prevented from being partially deformed, and reliably and firmly fixed to the inner surface of the back cover 8. In the case of this reinforcing plate 19, even though the flange section 22 of the terminal attachment member 17 is made of an insulating synthetic resin, damages to the flange section 22 due to the plurality of screw members 23 can be prevented since the plurality of screw members 23 is not intensively pressed onto the flange section 22**.

Also, in the component mounting member 16 of this wristwatch, since the packing groove 26 where the waterproof packing 27 is arranged is formed around the rim of the attachment hole 20 in the upper surface of the back cover 8 and the waterproof packing 27 is pressed into this packing groove 26 by the flange section 22 of the terminal attachment member 17, waterproofing between the upper surface of the back cover 8 and the undersurface of the flange section 22 of the terminal attachment member 17 can be reliably and favorably achieved. That is, even though the flange section 22 of the terminal attachment member 17 is made of an insulating synthetic resin, the waterproof packing 27 can be unfailingly pressed into the packing groove 26 by the flange section 22 since the flange section 22 is unfailingly pressed against the upper surface of the back cover 8 by the reinforcing plate 19.

In the present embodiment, the waterproof packing 27 has a D-shaped cross section. That is, its undersurface to be arranged on the bottom of the packing groove 26 is flat, and its upper surface has a shape to protrude from the packing groove 26 in an arc shape. As a result of this structure, when the flange section 22 of the terminal attachment member 17 is pressed with the waterproof packing 27 being arranged in the packing groove 26, the arc-shaped upper surface of the waterproof packing 27 protruding from the packing groove 26 is unfailingly pressed into the packing groove 26 by the flange section 22, whereby waterproofing between the upper surface of the back cover 8 and the undersurface of the flange section 22 of the terminal attachment member 17 can be reliably and favorably achieved.

In the above-described embodiment, the terminal attachment member 17 is made of an insulating synthetic resin. However, the present invention is not limited thereto. For example, it may be formed using a non-metal material such as insulating ceramics.

Also, in the above-described embodiment, the charging terminals 18 serve as terminals for the present invention. However, the terminals for the present invention are not necessarily required to be charging terminals, and any terminal may be used as long as it is a connection terminal such as a communication terminal.

Moreover, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock.

Furthermore, the present invention is not necessarily required to be applied in timepieces, and can be applied in electronic devices such as a portable telephone and a portable terminal device. In that case, unlike the above-described embodiment where the back cover 8 serves as a base member for the present invention, the base member is not necessarily required to be a back cover, and may be any member as long as it is a member to be attached to a case.

While the present invention has been described with reference to the preferred embodiments, it is intended that the invention be not limited by any of the details of the description therein but includes all the embodiments which fall within the scope of the appended claims.

What is claimed is:

1. A component mounting member comprising:

a base member which is provided with an attachment hole and attached to a case;

an attachment member which is inserted into the attachment hole of the base member so as to be attached to an inner surface of the base member located on an inner side of the case; and a terminal which is provided on the attachment member and exposed from the inner surface of the base member and an outer surface of the base member opposite to the inner surface, wherein the attachment member includes a main body to which the terminal is attached and which is arranged in the attachment hole of the base member, and a flange which is provided on an outer circumferential portion of the main body and attached to the inner surface of the base member, wherein an upper part of the main body protrudes above an upper surface of the flange, wherein the attachment member has a reinforcing plate arranged on the flange, wherein the reinforcing plate has a frame shape that is the same as a shape of the flange, and wherein a thickness of the reinforcing plate is substantially equal to a vertical height of the main body protruding above the upper surface of the flange.

2. The component mounting member according to claim 1, wherein the base member is formed of a metal that is more rigid than the attachment member, and the attachment member is formed of an insulating non-metal material.

3. The component mounting member according to claim 2, wherein the flange is attached to the inner surface of the base member by a plurality of screw members being inserted through the reinforcing plate.

4. The component mounting member according to claim 3, wherein a packing groove is formed around a rim of the attachment hole in the inner surface of the base member, and wherein the component mounting member comprises a waterproof packing pressed into the packing groove by the attachment member.

5. The component mounting member according to claim 4, wherein the waterproof packing is formed such that an undersurface thereof to be arranged on bottom of the packing groove is flat and an upper surface thereof has a shape to protrude from the packing groove in an arc shape.

6. The component mounting member according to claim 2, wherein a packing groove is formed around a rim of the attachment hole in the inner surface of the base member, and wherein the component mounting member comprises a waterproof packing pressed into the packing groove by the attachment member.

7. The component mounting member according to claim 1, wherein the flange is attached to the inner surface of the base member by a plurality of screw members being inserted through the reinforcing plate.

8. The component mounting member according to claim 7, wherein a packing groove is formed around a rim of the attachment hole in the inner surface of the base member, and wherein the component mounting member comprises a waterproof packing pressed into the packing groove by the attachment member.

9. The component mounting member according to claim 8, wherein the waterproof packing is formed such that an undersurface thereof to be arranged on bottom of the packing groove is flat and an upper surface thereof has a shape to protrude from the packing groove in an arc shape.

10. The component mounting member according to claim 7, wherein a cutout section into which the plurality of screw members is inserted in an outer circumferential side thereof is formed in the reinforcing plate.

11. The component mounting member according to claim 1, wherein a packing groove is formed around a rim of the attachment hole in the inner surface of the base member, and wherein the component mounting member comprises a waterproof packing pressed into the packing groove by the attachment member.

12. The component mounting member according to claim 11, wherein the waterproof packing is formed such that an undersurface thereof to be arranged on bottom of the packing groove is flat and an upper surface thereof has a shape to protrude from the packing groove in an arc shape.

13. The component mounting member according to claim 11, wherein the waterproof packing is arranged at a position where at least part of the waterproof packing is overlapped with the reinforcing plate when viewed from an upper surface.

14. A case comprising the component mounting member according to claim 1.

15. A timepiece comprising the case according to claim 14.

16. The timepiece according to claim 15 comprising:

a case; and a cover member which is provided on an opening of one end side of the case, wherein the base member is a back cover provided on an opposite side to the one end side of the case, wherein, in the attachment member, the flange is attached to the inner surface of the base member by a plurality of screw members being inserted through the reinforcing plate, and wherein head sections of the screw members are provided inside an area surrounded by the case, the cover member and the back cover.

17. The timepiece according to claim 15, wherein the component mounting member is arranged on a twelve o'clock side.

18. The component mounting member according to claim 1, wherein an end of the terminal protrudes past the reinforcing plate and the upper part of the main body.

19. The component mounting member according to claim 1, wherein the reinforcing plate has a frame shape along the attachment hole of the base member.

20. The component mounting member according to claim 6, wherein the waterproof packing is formed such that an undersurface thereof to be arranged on bottom of the packing groove is flat and an upper surface thereof has a shape to protrude from the packing groove in an arc shape.

* * * * *